United States Patent
Fujiwara

(10) Patent No.: US 6,883,826 B2
(45) Date of Patent: *Apr. 26, 2005

(54) CUSHION FOR PROTECTION OF A VEHICLE OCCUPANT'S HEAD

(75) Inventor: Tsuyoshi Fujiwara, Shiga (JP)

(73) Assignee: Takata Corporation, Tokyo (JP)

( * ) Notice: Subject to any disclaimer, the term of this patent is extended or adjusted under 35 U.S.C. 154(b) by 93 days.

This patent is subject to a terminal disclaimer.

(21) Appl. No.: 10/064,988

(22) Filed: Sep. 6, 2002

(65) Prior Publication Data

US 2003/0047919 A1 Mar. 13, 2003

(30) Foreign Application Priority Data

Sep. 7, 2001 (JP) ........................................ 2001-272128

(51) Int. Cl.$^7$ .............................................. B60R 21/22
(52) U.S. Cl. .................................. 280/730.2; 280/743.1
(58) Field of Search ............................ 280/729, 730.2, 280/730.1, 743.1, 743.2, 749

(56) References Cited

U.S. PATENT DOCUMENTS

| | | | |
|---|---|---|---|
| 3,780,388 A | * | 12/1973 | Thomas et al. ................ 5/711 |
| 5,240,283 A | | 8/1993 | Kishi et al. |
| 5,707,711 A | | 1/1998 | Kitamura |
| 5,730,464 A | * | 3/1998 | Hill ......................... 280/730.2 |
| 5,797,621 A | * | 8/1998 | Ono ............................ 280/729 |
| 6,168,191 B1 | | 1/2001 | Webber et al. |
| 6,220,625 B1 | | 4/2001 | Wallner et al. |
| 6,220,629 B1 | | 4/2001 | Wipasuramonton et al. |
| 6,264,234 B1 | | 7/2001 | Hill et al. |
| 6,458,724 B1 | | 10/2002 | Veiga et al. |
| 6,502,853 B2 | | 1/2003 | Keshavaraj |
| 6,517,110 B1 | | 2/2003 | Butters et al. |
| 6,585,293 B2 | | 7/2003 | Kishavaraj |
| 2003/0042716 A1 | * | 3/2003 | Fujiwara .................. 280/730.2 |

FOREIGN PATENT DOCUMENTS

| | | | |
|---|---|---|---|
| EP | 0 962 363 A1 | 12/1999 | |
| EP | 1 288 085 A2 | 3/2003 | |
| GB | 2 343 868 A | 5/2000 | |
| JP | 02037060 A | * 2/1990 | ........... B60R/21/18 |
| JP | 08-169294 A | 7/1996 | |
| JP | 11-310097 A | 11/1999 | |

* cited by examiner

Primary Examiner—Peter C. English
(74) Attorney, Agent, or Firm—Foley & Lardner LLP

(57) ABSTRACT

A cushion for protecting a vehicle occupant's head. The cushion inflates and deploys smoothly and is configured so that gas leakage out of the cushion is reduced in order to maintain the inner pressure high for an extended period of time. The cushion includes a protective cushion element and outer shell fabrics superposed on both outer surfaces of the protective cushion element. The cushion element includes a cabin-side base fabric and a window-side base fabric that are sewn together by sewing yarns after being bonded to each other by adhesive. The outer shell fabrics are bonded to the protective cushion element by adhesives. When the protective cushion element is inflated, the outer shell fabrics are tightly stretched over the outer surfaces of the inflated protective cushion element so as to cover depressed portions of the base fabrics.

15 Claims, 9 Drawing Sheets

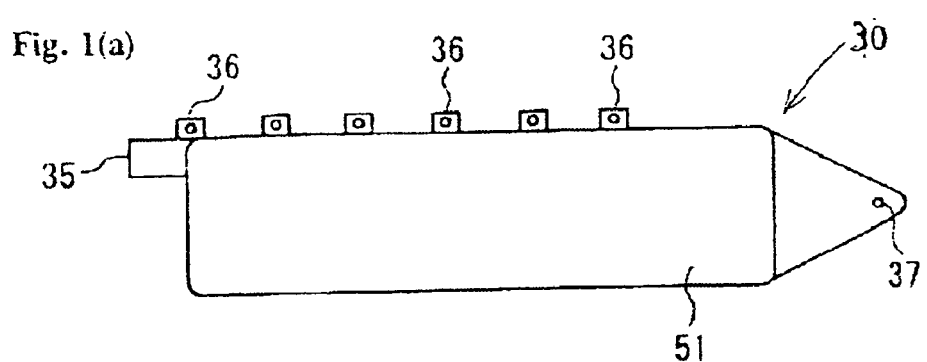

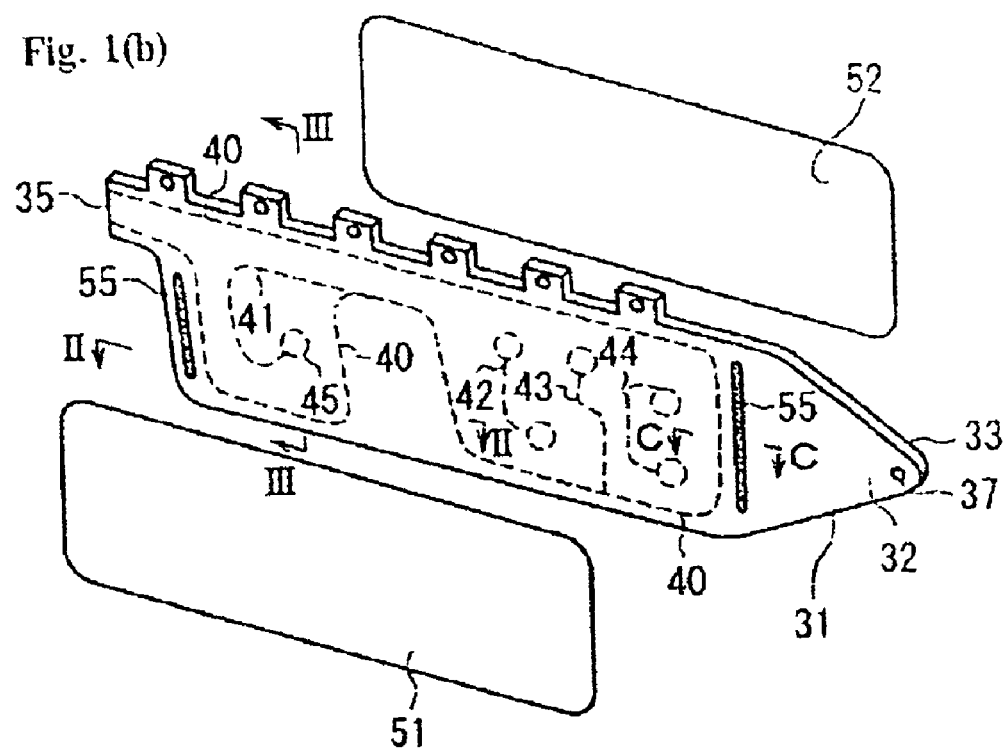

CUSHION FOR PROTECTION OF A VEHICLE OCCUPANT'S HEAD

BACKGROUND

The present invention relates to a protective cushion for protection of a vehicle occupant's head. More particularly, the present invention relates to a cushion which is folded and disposed along an upper corner of a side of a vehicle cabin in the normal state and is inflated into a curtain shape to expand over windows of side doors and a B-pillar in the event of a side impact collision or roll-over of the vehicle.

One embodiment of a protective cushion for protection of occupant's head, is a curtain airbag which is folded and disposed along an upper corner of a side of a vehicle cabin in the normal state (i.e., when a vehicle is not in the emergency situation such as the event of a vehicle collision). The airbag inflates into a curtain shape to expand over windows of side doors and a B-pillar in the event of a side impact collision or roll-over of a vehicle. The protective cushion may include two base fabrics which are joined together along their peripheries at a line-shaped joint by stitches of sewing yarns to form a chamber between the base fabrics. The chamber is designed to be filled with gas.

FIGS. 6(a)–6(c) disclose an exemplary protective cushion or side airbag for protection of a vehicle occupant's head. FIG. 6(a) is a front view of a protective cushion 1 for protection of vehicle occupant's head. FIG. 6(b) is a sectional view taken along a B—B line of FIG. 6(a), and FIG. 6(c) is a sectional view taken along a C—C line of FIG. 6(a).

As shown in FIG. 6(b), the protective cushion 1 includes a cabin-side (i.e. passenger side) base fabric 2 and a window-side base fabric 3 which are superposed and sewn to each other so as to form a chamber 4 between the base fabrics 2 and 3.

The base fabrics 2, 3 are joined to each other along a joint 10 extending around the peripheries of the fabrics. As shown in FIG. 6(a), the joint 10 may extend inward from the edge of the fabric. The curtain may also include joints 11, 12 for subdividing the chamber 4, and circular joints 13 for reinforcing areas around ends of the line-shaped joints 11, 12. Each of the circular joints 13 may include a circular opening 14 formed at the center thereof by cutting out the base fabrics 2, 3.

The cushion 1 extends along the side of the vehicle cabin in the longitudinal direction of the vehicle. The cushion 1 is provided at the front end and the rear end in the longitudinal direction thereof with projecting portions 16, 18 which are formed with holes 17, 19 to facilitate installation of the cushion to the vehicle body. The cushion 1 is provided along the upper edge thereof with a plurality of projections 20 which are also formed with holes 21 to facilitate connection of the cushion 1 to the vehicle body.

A gas inlet 5 through which gas from an inflator (not shown) is introduced is formed at the front end or the rear end (see FIG. 6(a)) of the cushion 1. It should be understood that the position of the gas inlet 5 is not limited thereto and the inflator may be disposed inside the cushion.

The line-shaped joint 11 is apart from the line-shaped joint 10 extending along the cushion. Each end of the line-shaped joint 11 are respectively connected to the circular joints 13.

The upper and lower ends of the line-shaped joint 12 both are apart from the line-shaped joint 10 extending along the upper edge and the lower edge of the cushion and both are connected to the circular joints 13, respectively. The line-shaped joints 11, 12 limit the thickness of the inflated chamber 4. The circular joints 13 reinforce the ends of the line-shaped joints 11, 12.

The cushion 1 may be installed so that the projecting portion 16 at the front end is fixed to an A-pillar of the vehicle by bolts or rivets through the holes 17 thereof. The projecting portion 18 at the rear end may be fixed to a C-pillar by a bolt or rivet through the hole 19 thereof, and the projections 20 along the upper edge may be fixed to a roof side rail by bolts or rivets through the holes 21 thereof. Prior to deployment, the cushion 1 is stored in a folded condition along the upper corner of the vehicle side surface along the roof side rail. The folded cushion 1 may be covered by a cover (not shown). The cover is adapted to be torn or opened when the cushion 1 is inflated.

When the vehicle suffers a side impact collision or roll-over, the inflator (not shown) is actuated, gas flows into the chamber 4 through the gas inlet 5 so that the cushion 1 is inflated and deployed downwardly along the side surface of the vehicle cabin into the curtain shape, thereby protecting the head of occupant.

It is preferable to maintain the head protecting cushion in the inflated state for a period of time (at least several seconds) after inflation not only for prevention of collision of the occupant's head to the window glass or the B-pillar at the instant of the side impact collision of the vehicle but also for protection of the occupant just after the roll-over of the vehicle.

The protective cushion is inflated in a relatively narrow space between the occupant's head and the window glass or the B-pillar in the event of a side impact collision of the vehicle. Accordingly, it is necessary to reduce the thickness of the protective cushion when inflated. As a result, the cabin-side base fabric 2 and the window-side base fabric 3 are connected by line-shaped joints 11, 12 and circular joints 13 in addition to the peripheral connecting seam 10.

As the cushion 1 is inflated, depressed portions C recessed from the outer surfaces of the inflated cushion 1 are created near the joints 11, 12, 13, as shown in FIG. 6(c). Conventional airbags lack a covering for the depressed portions, thus, creating an uneven surface that contacts the occupants head. As a result, the surface area of the cushion that contacts the occupant and/or the vehicle is reduced and the amount of energy absorbed by the cushion is also reduced.

SUMMARY OF THE INVENTION

According to an embodiment of the present invention a cushion for protection of vehicle occupant's head is provided. The cushion is fixed at its upper portion to a portion near the corner between a ceiling and a side surface of a vehicle cabin and is inflated downwardly along the side surface by gas and comprises a cabin-side base fabric and a window-side base fabric which are connected to form an envelope shape. The protective cushion is configured so that the cabin-side base fabric and the window-side base fabric are joined at least one joint portion besides the joint portion along the periphery of the protective cushion, whereby at least one depressed portion is created at and around the joint portion when the protective cushion is inflated. The cushion includes an outer shell fabric for covering said depressed portion which is superposed on at least the outer surface of the cabin-side base fabric, said outer shell fabric being joined to the protective cushion.

According to the aforementioned embodiment of the present invention, the outer shell fabric covers the depressed portion. Therefore, the amount of energy absorbed by the cushion when the occupant's head comes in collision with a portion at or around the depressed portion increases from the amount of energy absorbed by a protective cushion without a covering for the depressed portion.

The outer shell fabric may be arranged on the cabin-side only and/or may include fabric covering the window-side too. When the outer shell fabrics are arranged on both sides, the energy absorbing amount is further increased. In addition, the protective cushion is easily inflated into a symmetrical configuration relative to the cabin-side and the window-side.

In the present invention, the outer shell fabric(s) is preferably joined to the protective cushion at portions along a pair of opposite sides. This is because the joint portions of the outer shell fabric to the protective cushion may easily increase the volume of the protective cushion in the folded state. By reducing the number and volume of the joint portions between the outer shell fabric and the protective cushion as small as possible, the volume of the protective cushion in the folded state can be reduced.

Alternatively, by shifting the joint portions from between said cabin-side base fabric and said window-side base fabric to the joint portions of the outer shell fabric(s) relative to the protective cushion, the volume of the protective cushion in the folded state can be reduced.

It is to be understood that both the foregoing general description and the following detailed description are exemplary and explanatory only, and are not restrictive of the invention as claimed.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1(a) is a side view of a cushion for protection of vehicle occupant's head according to an embodiment.

FIG. 1(b) is an exploded perspective view of the embodiment of FIG. 1(a).

FIGS. 2(a), 2(b) are sectional views taken along a line II—II of FIG. 1(b), wherein FIG. 2(a) shows the non-inflated state and FIG. 2(b) shows the inflated state.

FIGS. 3(a), 3(b) are sectional views taken along a line III—III of FIG. 1 (b), wherein FIG. 3(a) shows the non-inflated state and FIG. 3(b) shows the inflated state.

DETAILED DESCRIPTION

Figure 1C:
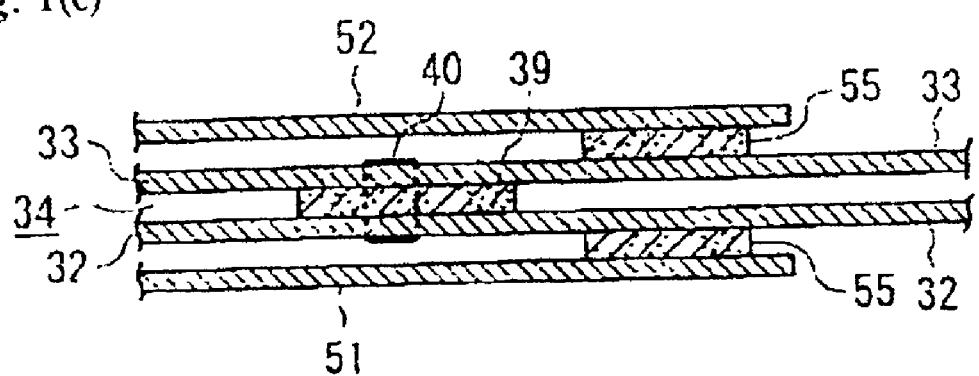
FIG. 1(c) is a sectional view taken along a line C—C of FIG. 1(b).
Figure 2A:
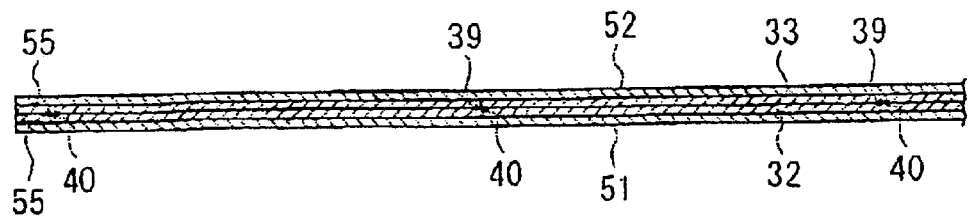
Figure 2B:
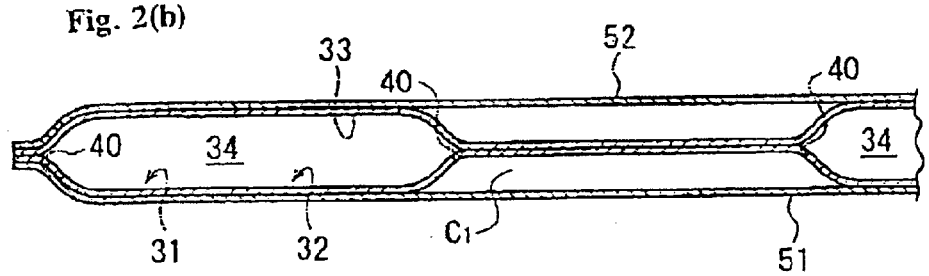
Figure 3A:
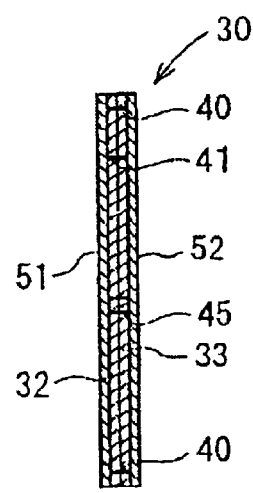
Figure 3B:
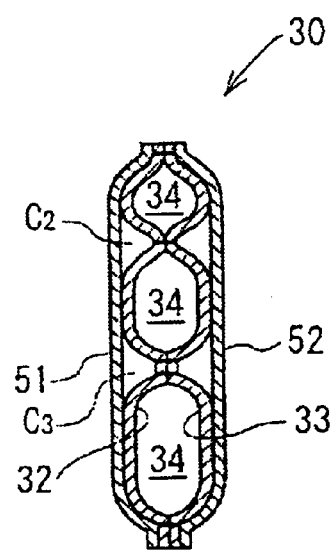

Hereinafter, embodiments of the present invention will be described with reference to the attached drawings. FIG. 1(a) discloses a protective cushion 30 for protection of vehicle occupant's head according to an embodiment of the present invention. The cushion includes a protective cushion element 31, and outer shell fabrics 51, 52 superposed on the both side surfaces of the protective cushion element 31, as shown in FIG. 1(b).

Also in this exemplary embodiment of the present invention, the protective cushion element 31 comprises a cabin-side base fabric or sheet 32 and a window-side base fabric or sheet 33 which are sewn to each other by sewing yarns in order to form a chamber 34 between the base fabrics 32 and 33. The base fabrics 32, 33 are joined to each other by joints or seams formed with sewing yarns including a line-shaped joint 40 extending around the peripheries of the base fabrics (with some parts thereof extending inward of the base fabrics 32, 33), line-shaped joints 41, 42, 43, 44 for subdividing the chamber 34 and for restraining the thickness of the cushion by a predetermined amount, and circular joints 45 for reinforcing areas around ends of the line-shaped joints 41–44.

According to this embodiment of the present invention, the cabin-side base fabric 32 and the window-side base fabric 33 are bonded to each other by adhesive 39. Following the bonding with adhesive, the fabrics are sewn together by sewing yarns.

The protective cushion element 31 is provided at the rear end thereof with a gas inlet 35 for introduction of gas from an inflator (not shown). The protective cushion element 31 is provided along the upper edge thereof with a plurality of projections 36 for installation of the protective cushion 30 to a vehicle body such as a roof side rail. The projections 36 are formed with holes for insertion of bolts, respectively. The protective cushion element 31 is provided at the front end thereof with holes 37 for installation to an A-pillar.

The outer shell fabrics 51, 52 may have a rectangular shape different from the shape of the cabin-side base fabric 32 and the window-side base fabric 33 as main parts. The shape of the outer shell fabrics 51, 52 may include any shape in which the outer shell fabric is capable of substantially entirely covering depressed portions C (which are described further below). The outer shell fabrics 51, 52 may include any shape in which the outer shell fabric is capable of substantially corresponding to the shape of the window-side base fabric 33 or the cabin-side base fabric 32. The outer shell fabrics 51, 52 may be made of the same fabric of the protective cushion element 31 and are preferably made of relatively thin fabric of, for example, 70–210 deniers in order to reduce the volume of the folded cushion as small as possible.

The outer shell fabrics 51, 52 may be bonded to the protective cushion element 31 by adhesives 55. In the exemplary embodiment of the present invention shown in FIGS. 1(a)–1(c), the adhesives 55 are applied to the outer surfaces of the protective cushion element 31 into a narrow band shape along the line-shaped joint 40 at the front end and the rear end of the cushion. The adhesives 55 are spaced from the position of the line-shaped joint 40. In this embodiment, the adhesives 55 are located on the outside of the line-shaped joint 40 of the protective cushion element 31.

The protective cushion 30 for protection of vehicle occupant's head is fixed to the vehicle body in the folded state by the holes of the projections 36 and the hole 37 at the front end. The protective cushion 30 for protection of vehicle occupant's head is covered by a cover (not shown). The cover is adapted to be torn or opened when the protective cushion 30 is inflated. The cover may be a roof garnish or decoration for the vehicle.

When the vehicle suffers a side impact collision or rollover, the inflator is actuated, gas flows into the chamber 34 through the gas inlet 35 so that the cushion 30 is inflated and deployed downwardly along the side surface of the vehicle cabin, thereby protecting the head of the occupant. During the deployment of the cushion or side airbag, since the line-shaped joints 40–44 and circular joints 45 join the cabin-side base fabric 32 and the window-side base fabric 33, the thickness of portions around the joints 40–44 and 45 of the protective cushion element 31 is smaller than that of the other portions.

Accordingly, depressed portions C (C1, C2, C3) recessed from the outer surfaces of the protective cushion 31 are created at and around the joints 40–44 and 45. The outer shall fabrics 51, 52 cover the depressed portions C. Since the outer shell fabrics 51, 52 are bonded at their ends to the protective cushion element 31 by the adhesives 55, the outer shell fabrics 51, 52 are tightly stretched over the outer surfaces of the inflated protective cushion element 31 so that the depressed portions C are covered by the outer shell fabrics 51, 52 just like lids. Therefore, when the occupant's head plunges into the cushion toward the depressed portion C, the occupant's head can be received by the outer shell fabrics 51, 52. As a result, the impact of the occupant's head can be absorbed by a region including the depressed portion C and the outer shell fabric covering the depressed portion C, thereby increasing the absorbing amount.

In this embodiment, the inflated protective cushion element 31 is prevented from being damaged by fragments of window glasses because the inflatable portion of the cushion element 31 is entirely shielded by the outer shell fabrics 51, 52.

Figure 4:
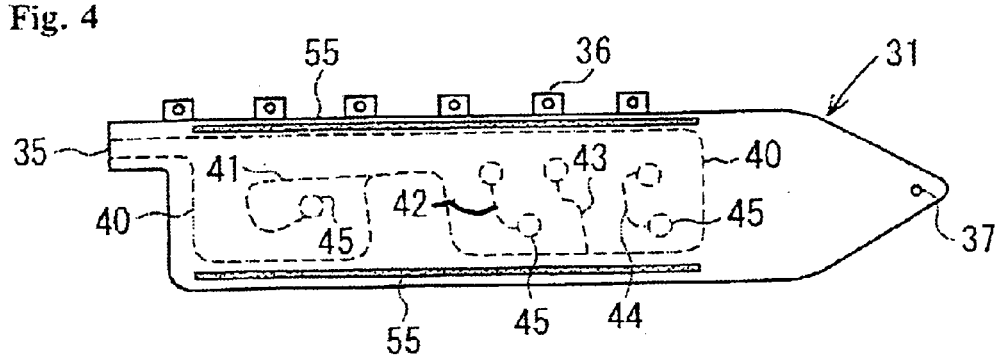
FIG. 4 is a side view of a protective cushion according to another embodiment of the present invention.

Though the adhesives 55 are only applied to the portions at the both ends in the longitudinal direction of the protective cushion element 31 in the aforementioned embodiment, the adhesives 55 may also be applied to portions along the upper and lower edges of the protective cushion element, as shown in the alternative embodiment of the present invention disclosed in FIG. 4, in order to join the protective cushion element 31 and the outer shell fabrics 51, 52 at these portions. Further, the adhesives 55 may be applied to the entire periphery of the protective cushion element. The application of the adhesives 55 increases the volume of the protective cushion when folded. Therefore, it is preferable to apply the adhesives 55 only at the both ends or along the upper and lower edges of the cushion.

In order to reduce the volume of the cushion when folded, the adhesives 55 and the adhesive 39 are preferably arranged to not be superposed on each other like the illustrated embodiment.

Figure 5A:
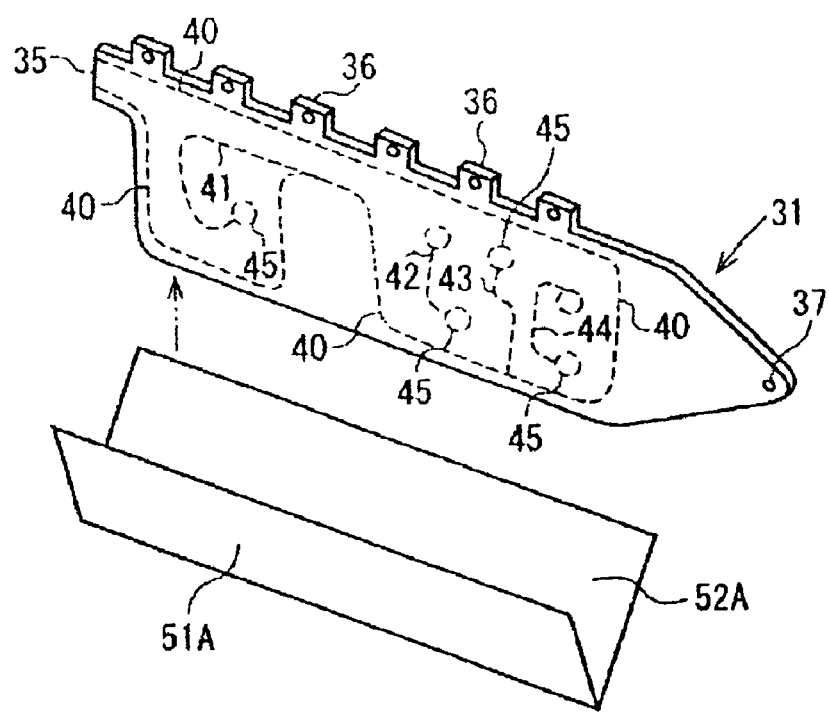
FIG. 5(a) is an exploded perspective view of a cushion according to another embodiment of the present invention.
Figure 5B:
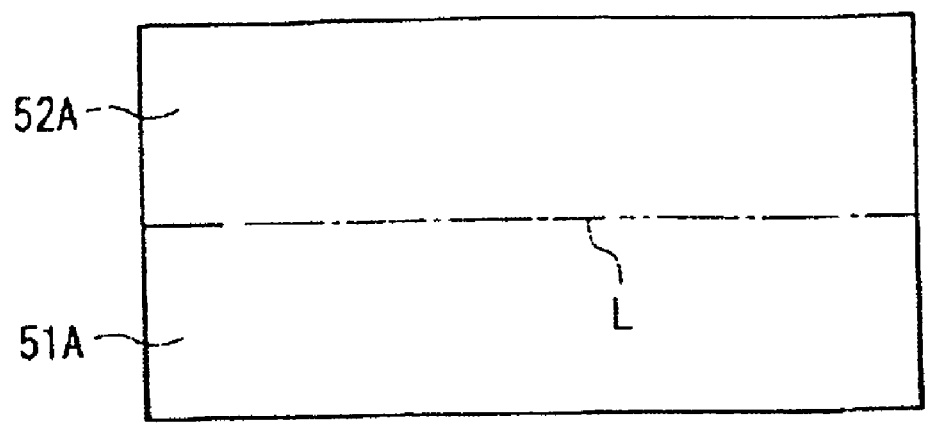
FIG. 5(b) is a view of the fabric panels of the cushion shown in FIG. 5(a).
Figure 6A:
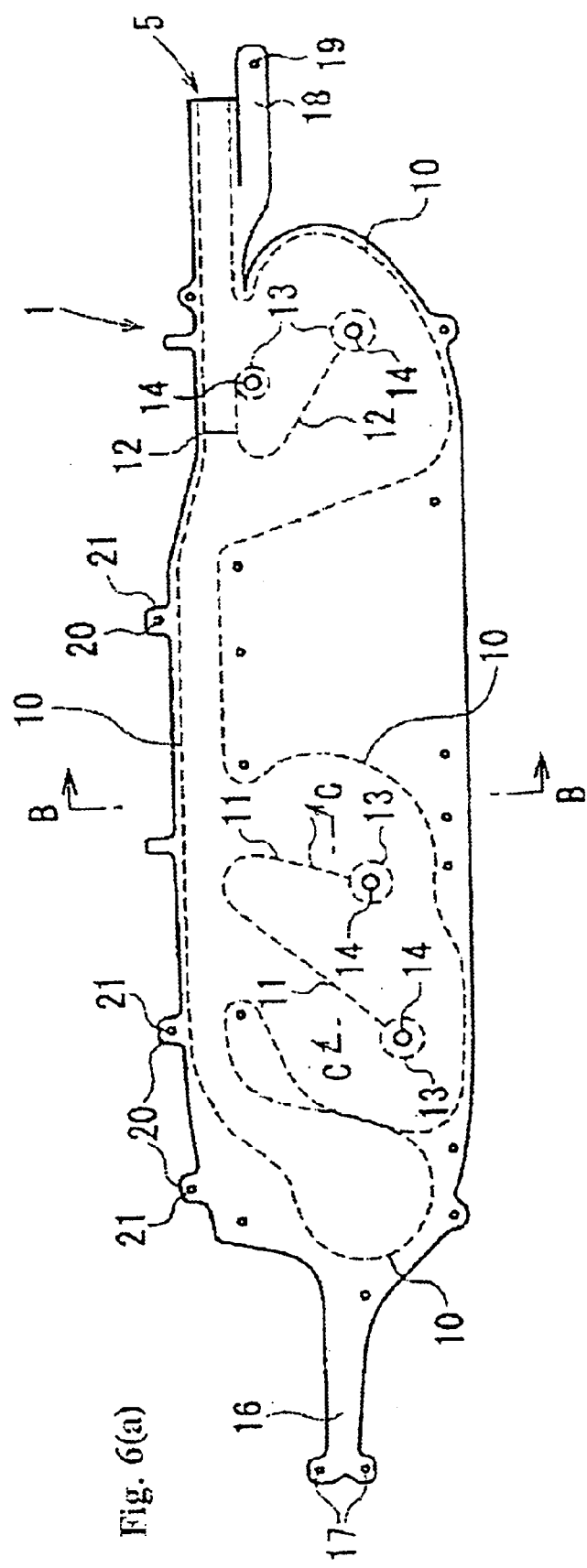
FIG. 6(a) is a front view of a cushion for protection of vehicle occupant's head according to a conventional example.
Figure 6B:
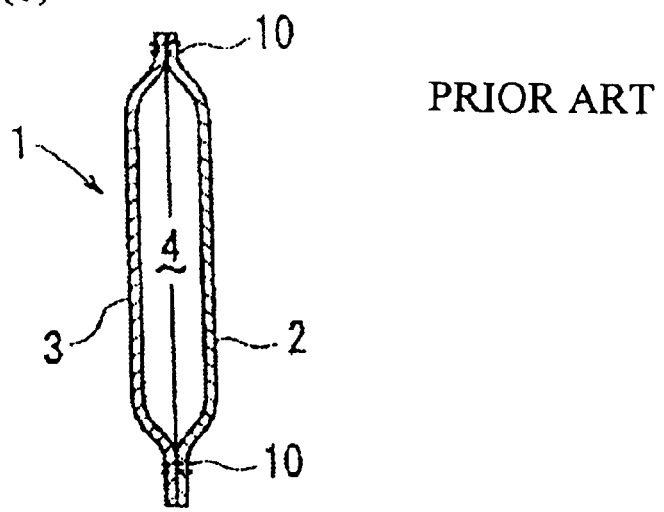
FIG. 6(b) is a sectional view taken along a B—B line of FIG. 6(a)
Figure 6C:
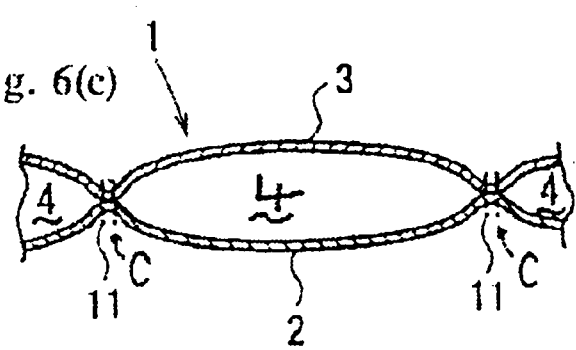
FIG. 6(c) is a sectional view taken along a C—C line of FIG. 6(a).

Though the outer shell fabrics 51, 52 are separate pieces in the aforementioned embodiment, the outer shell fabrics may be outer shell fabrics 51A, 52A composed of one continuous piece as shown in FIGS. 5(a), 5(b). The piece for the outer shell fabrics 51A, 52A is folded double along the center line L and is superposed on and bonded to the protective cushion element 31 by the adhesive as shown in FIG. 5(a).

Though the adhesives 55 are applied to be positioned on the outside of the line-shaped joint 40 in the aforementioned embodiments, the adhesives 55 may also or alternatively be positioned on the inside of the line-shaped joint 40 of the protective cushion element 31.

Though the outer shell fabrics 51, 52 are arranged on both the cabin-side and window-side of the protective cushion element 31 in the aforementioned embodiments, the outer shell fabric 51 may be arranged on the cabin-side only. According to this arrangement, the protective cushion 30 may warp toward the inside of the cabin when the protective cushion 30 is inflated. Therefore, it is preferable that the outer shell fabrics 51, 52 are arranged on both sides. As the outer shell fabrics 51, 52 are arranged on both sides, the protective cushion 30 never warps and is inflated into a symmetrical configuration relative to the cabin-side and the window-side.

The protective cushion element and the outer shell fabrics may be fixed by sewing instead of adhesive. In this case, the outer shell fabrics may be sewn to the protective cushion element at the same time as sewing the outer periphery of the protective cushion element, thereby reducing the number of manufacturing steps. The outer shell fabric may be fixed to the window-side fabric and cabin-side fabric so that the connecting joints that connect the outer shell fabric to the cabin-side fabric are not symmetrical to the connecting joints connecting the outer shell fabric to the window-side fabric about a line dividing the section of the outer shell fabric covering the cabin-side fabric from the section of the outer shell fabric covering the window-side fabric.

It should be understood that the present invention is not limited to the illustrated embodiments and may take another configuration than the illustrated ones.

As described above, the present invention can provide a protective cushion for head protection which can sufficiently absorb the impact even with portions at/around the depressed portions of the protective cushion element.

Given the disclosure of the present invention, one versed in the art would appreciate that there may be other embodiments and modifications within the scope and spirit of the invention. For example, in one embodiment of the present invention the outer shell fabric may only be placed on the side of the cushion facing the passenger. Accordingly, all modifications attainable by one versed in the art from the present disclosure within the scope and spirit of the present invention are to be included as further embodiments of the present invention. The scope of the present invention is to be defined as set forth in the following claims.

What is claimed is:

1. A cushion for protecting a vehicle occupant's head, the cushion having an upper portion fixed to a vehicle near a corner between a ceiling and a side surface of a vehicle cabin and wherein the cushion is adapted to inflate downwardly along the side surface, the cushion comprising:

a cabin-side base fabric and a window-side base fabric sewn together along a peripheral seam to form a chamber for receiving gas, wherein the cabin-side and window-side fabrics are connected together at a joint located in the interior of the chamber, whereby a depressed region is formed on an exterior surface of the cabin-side fabric around the joint when the chamber is inflated by gas;

an outer shell fabric connected to the cabin-side fabric and covering the cabin-side base fabric at the depressed region; and wherein the outer shell is attached to the cabin-side base fabric outside of the peripheral seam.

2. The cushion of claim 1, wherein the outer shell fabric includes a section covering a depressed region on an exterior surface of the window-side fabric around the joint.

3. The cushion of claim 1, wherein the outer shell fabric is connected to the window-side fabric and cabin-side fabric along a plurality of connecting joints.

4. The cushion of claim 3, wherein the connecting joints connecting the outer shell fabric and the cabin-side fabric and the connecting joints connecting the outer shell fabric and the window-side fabric do not overlay the joint connecting the cabin-side fabric to the window-side fabric.

5. The cushion of claim 1, wherein the seam where the cabin-side base fabric and the window-side base fabric are sewn together is located along the periphery of the base fabrics.

6. The cushion of claim 1, wherein the cabin-side base fabric and the window-side base fabric are bonded together by adhesive along the seam.

7. The cushion of claim 1, further comprising another, separate outer shell fabric, one of the outer shell fabrics covering the exterior surface of the cabin-side base fabric and the other of the outer shell fabrics covering an exterior surface of the window-side base fabric.

8. A side airbag for protecting a vehicle passenger comprising:
   an inflatable cushion comprising a window side sheet and a passenger side sheet, wherein the sheets are sewn together along a peripheral seam to thereby create an inflatable chamber between the sheets;
   wherein the sheets are further connected along an interior seam located within the chamber to thereby limit the outward expansion of the chamber during inflation; a layer of fabric attached to an exterior surface of the passenger side sheet, wherein the layer of fabric covers a depressed region formed adjacent the interior seam when the airbag inflates; and
   wherein the layer of fabric is attached to the passenger side sheet outside of the peripheral seam.

9. The side airbag of claim 8, wherein the shape of the fabric layer corresponds substantially to the shape of the passenger side sheet.

10. The side airbag of claim 8, wherein the layer of fabric is connected to the passenger side sheet at a peripheral portion of the fabric layer so that the fabric layer is tightly stretched over the depressed region of the passenger side sheet formed around the interior seam when the chamber is inflated.

11. The side airbag of claim 8, wherein the layer of fabric is attached to the passenger side sheet by adhesive.

12. A cushion for protecting the head of a vehicle passenger comprising:
   a window side sheet and a passenger side sheet, wherein the sheets are sewn together along a peripheral seam located along a periphery of the window side sheet and the passenger side sheet; and wherein the sheets are further connected by interior seams that divide an inflatable chamber located between the sheets;
   a layer of fabric attached to the exterior of the window side sheet and the passenger side sheet by adhesive, wherein the adhesive is located between the layer of fabric and the sheets at opposite ends of the fabric layer so that the layer of fabric stretches over the interior seams when the chamber is inflated; and wherein the shape of the fabric layer corresponds substantially to the shape of the sheets.

13. The cushion of claim 12, wherein the layer of fabric comprises a first portion connected to the window side sheet and a second portion connected to the passenger side sheet.

14. A side airbag for protecting a vehicle passenger comprising:
   an inflatable cushion comprising a window side sheet and a passenger side sheet, wherein the sheets are sewn together along a peripheral seam to thereby create an inflatable chamber between the sheets;
   wherein the sheets are further connected along an interior seam located within the chamber to thereby limit the outward expansion of the chamber during inflation; and
   a layer of fabric attached to an exterior surface of the window side sheet by adhesive, wherein the layer of fabric covers the interior seam; and
   wherein the layer of fabric is attached to the window side sheet outside the peripheral seam.

15. The side airbag of claim 14, wherein the shape of the fabric layer corresponds substantially to the shape of the window side sheet.

* * * * *